(12) United States Patent
Hoshal

(10) Patent No.: US 7,028,546 B2
(45) Date of Patent: Apr. 18, 2006

(54) DATA RECORDER

(75) Inventor: Gregory D. Hoshal, Okemos, MI (US)

(73) Assignee: Instrumented Sensor Technology, Inc., Okemos, MI (US)

( * ) Notice: Subject to any disclaimer, the term of this patent is extended or adjusted under 35 U.S.C. 154(b) by 0 days.

(21) Appl. No.: 10/690,279

(22) Filed: Oct. 21, 2003

(65) Prior Publication Data

US 2005/0081629 A1    Apr. 21, 2005

(51) Int. Cl.
  *G01P 15/00* (2006.01)
  *G01P 3/00* (2006.01)
  *G01D 1/14* (2006.01)

(52) U.S. Cl. .................... 73/489; 73/495; 73/511; 702/141

(58) Field of Classification Search ............ 73/493, 73/510, 511, 431, 489, 488, 491, 495; 702/141; 701/70, 35
  See application file for complete search history.

(56) References Cited

U.S. PATENT DOCUMENTS

| 3,895,521 | A | * | 7/1975 | Howard ................ 73/178 R |
|---|---|---|---|---|
| 3,974,699 | A | * | 8/1976 | Morris et al. .............. 73/865.9 |
| 5,255,565 | A | * | 10/1993 | Judd et al. ..................... 73/579 |
| 5,615,132 | A | * | 3/1997 | Horton et al. ................. 703/7 |
| 5,754,449 | A |   | 5/1998 | Hoshal et al. |
| 5,890,093 | A | * | 3/1999 | Mark et al. ................. 701/220 |
| 6,067,488 | A | * | 5/2000 | Tano ........................... 701/35 |
| 6,122,959 | A |   | 9/2000 | Hoshal et al. |
| 6,292,759 | B1 | * | 9/2001 | Schiffmann ................. 702/151 |
| 6,305,221 | B1 | * | 10/2001 | Hutchings ..................... 73/488 |
| 6,421,622 | B1 | * | 7/2002 | Horton et al. ................ 702/95 |
| 6,438,472 | B1 | * | 8/2002 | Tano et al. ................... 701/35 |
| 6,549,834 | B1 |   | 4/2003 | McClellan et al. |

FOREIGN PATENT DOCUMENTS

JP            9-52569       * 2/1997

* cited by examiner

*Primary Examiner*—Helen Kwok
(74) *Attorney, Agent, or Firm*—Warner Norcross & Judd LLP

(57) ABSTRACT

A compact data recorder includes angular rate sensors for monitoring rotational movement about three axes. Three linear accelerometers, or one triaxial linear accelerometer, track linear movement along the same three axes. A processor and memory record outputs from the angular rate sensors and the linear accelerometers.

48 Claims, 2 Drawing Sheets

DATA RECORDER

BACKGROUND OF THE INVENTION

The invention relates to data recording, and more particularly, to an apparatus for recording linear and angular velocity.

Sudden changes in linear and rotational velocity are often dangerous. The study of these changes is important to design safer methods and devices for transporting objects and people.

Compact data recorders, such as the one described in U.S. Pat. No. 6,122,959, have proven invaluable in collecting linear velocity and acceleration information. The recorders are small enough to be used in field tests. The data recorders use an arrangement of linear accelerometers or a single triaxial accelerometer to monitor changes in velocity. While compact data recorders are well suited to tracking changes in linear movement, they are not as effective as recording rotational movement.

Real world motion is rarely purely linear. Often an object will spin or rotate about an axis as well as move linearly. In some instances, the angular velocity of an object causes more damage than its linear acceleration. For example, if a motor vehicle begins to spin violently, the high rotational velocity endured by an occupant may cause severe brain injury. Thus, to understand the forces associated with motion, recording of both angular velocity and linear acceleration is important.

A compact data recorder capable of recoding angular velocity, linear velocity and linear acceleration would thus be highly desirable.

SUMMARY OF THE INVENTION

These problems are overcome by a data recorder capable of measuring both angular velocity as well as linear velocity and linear acceleration. Such a compact data recorder includes three linear accelerometers and three angular rate sensors contained within a housing. Each angular rate sensor is arranged to monitor motion about one of three axes, while each of the linear accelerometers is also arrange to monitor motion along one of the three axes. A processor and memory are provided to record the angular velocity, the peak linear acceleration and linear velocity of the data recorder.

The angular rate sensors provide data related to the motion of the data recorder about the axes, while the linear accelerometers provide data about movement along the axes. The data recorder thus records motion in all six degrees of motions, producing a more accurate representation of the movement. Because the data recorder has a small footprint and weight, the data recorder can be used in a variety of different situations.

These and other objects, advantages and features of the invention will be more readily understood and appreciated by reference to the detailed description of the drawings.

DETAILED DESCRIPTION OF THE DRAWINGS

Figure 1:
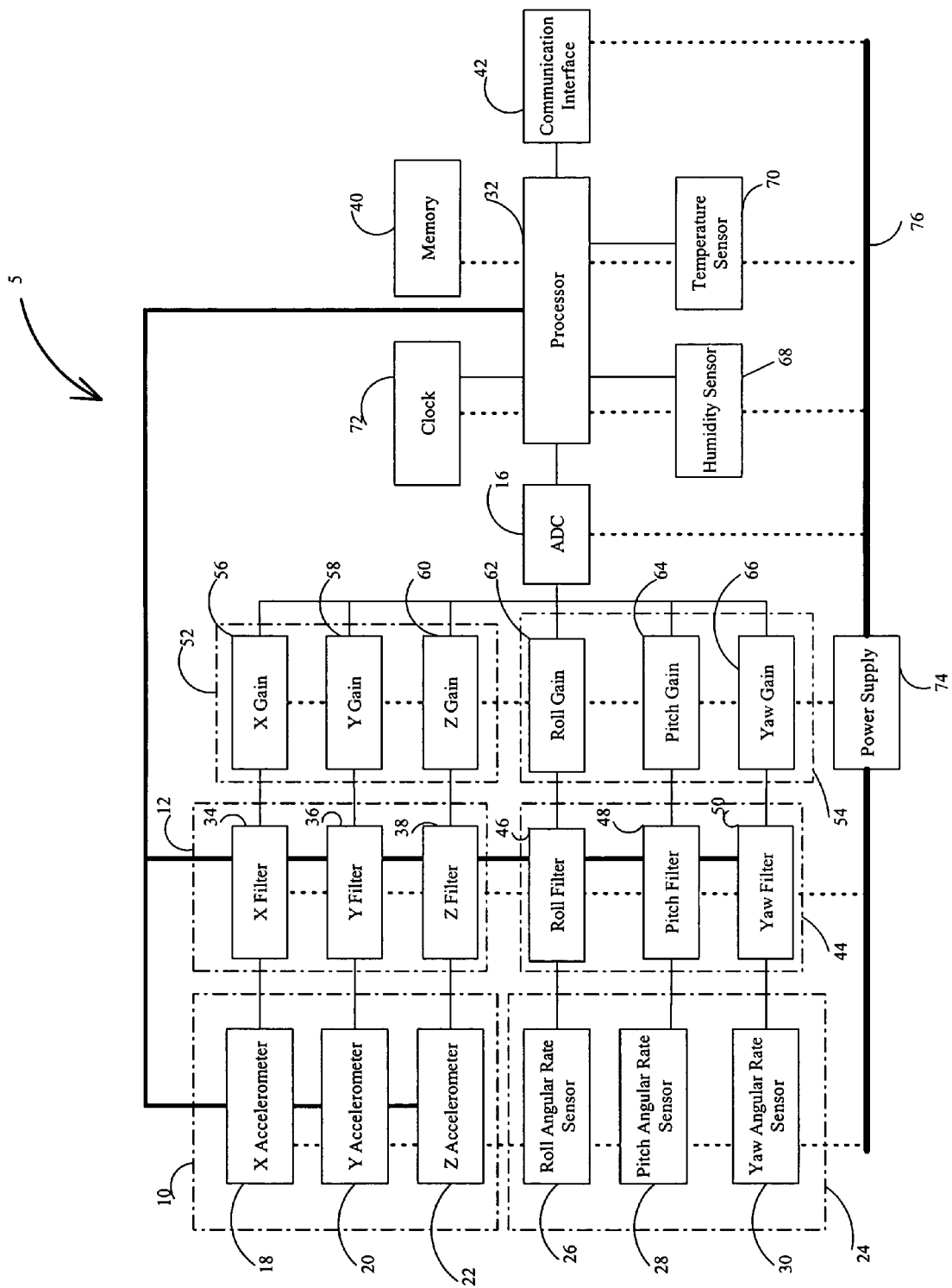
FIG. 1 is a block diagram of a data recorder.

FIG. 1 shows self-contained data recorder 5 for recording rotational velocity and linear acceleration.

Accelerometers 18, 20, 22 are connected by way of filters and gain circuits to analog-to-digital converter (ADC) 16. Accelerometer array 10 contains X-axis linear accelerometer 18, Y-axis linear accelerometer 20 and Z-axis linear accelerometer 22. The accelerometers are connected by way of filters and gain circuits to analog-to-digital converter (ADC) 16. Linear accelerometers 18, 20, 22 could be three separate accelerometers or a single device providing separate outputs for the X-axis, Y-axis and Z-axis. Each of linear accelerometers 18, 20, 22 provides at least one linear accelerometer output.

Angular sensor array 24 includes roll angular rate sensor 26, pitch angular rate sensor 28 and yaw angular rate sensor 30. Each angular rate sensor 26, 28, 30 provides at least one angular rate sensor output proportional to the angular velocity about its axis. The Gyrostar®, manufactured by Murata Manufacturing Co., Ltd., could be used as such an angular rate sensor.

Accelerometer filter array 12 contains X-axis filter 34, Y-axis filter 36, and Z-axis filter 38. The filters are adjustable for a frequency range from 10–200 Hz. A high frequency setting for the filter allows the recorder to detect small vibrations, while a low frequency setting allows the recorder to detect only large vibrations. The response frequency of each filter is programmed by processor 32 in response to user instructions either stored in memory 40 or sent by way of communication interface 42.

Angular rate filter array 44 contains roll filter 46, pitcher filter 48, and yaw filter 50. Similar to accelerometer filters 26, 28, 30, angular rate filters 46, 48, 50 are adjustable for a frequency range of 10–200 Hz. The angular rate filters are programmable by processor 32 based upon instructions stored in memory 40 or received by way of communication interface 42.

Linear accelerometer gain array 52 and angular rate gain array 54 boosts the signal from the linear accelerometer array 12 to a level sufficient for ADC 16. Linear accelerometer gain array 48 contains three linear accelerometer gain circuits comprising X-axis gain circuit 56, Y-axis gain circuit 58, and Z-axis gain circuit 60. Angular rate gain array 54 contains roll gain circuit 62, pitch gain circuit 64, and yaw gain circuit 66.

ADC 16 multiplexes the signals from linear accelerometer gain array 46 and angular rate gain array 48 and converts the output to a 10-bit digital value for processor 32. Processor 32 may receive the output from ADC 16 either on separate channels or as multiplexed data through one channel.

Humidity sensor 68 produces a humidity sensor output and temperature sensor 70 produces a temperature sensor output. Humidity sensor 68 and temperature sensor 70 are connected directly to processor 32 if processor 32 has analog inputs. If not, then humidity sensor 68 and temperature sensor 70 would be connected to processor 32 through ADC 16. Clock 72 provides time information to processor 32 so that the length, duration, and time of an event can be recorded. Clock 72 can be used to generate a time stamp of an event.

Memory 40 connected to processor 32 stores the humidity sensor output or the temperature sensor output in memory 40. It may also contain programming information for processor 32, filter arrays 12, 44, and linear accelerometers 18, 20, 22. It also stores time information from clock 72.

Communication interface 42 may be an RS-232 interface, a USB (uniform serial bus) interface, a IrDA (infrared data association) interface, or a wireless communication device. A suitable wireless communication device might include a wireless network adapter or a radio transceiver.

Communication interface 42 allows for information and instructions to be loaded into memory 40 as well as for retrieval of information stored in memory 40. Prior to startup, the linear accelerometers thresholds for each linear accelerometer 18, 20, 22 and the angular rate thresholds for each angular rate sensors 26, 28, 30 are downloaded to the system through communication interface 42. The maximum time for recording any event is also downloaded through communication interface 42.

Power supply 74 provides power through bus 76 to all active devices within the data recorder needing a power source. Power supply 74 could be regulated by processor 32.

A housing is used to enclose the various parts of self-contained data recorder 5. If X-axis linear accelerometer 18, Y-axis linear accelerometer 20 and Z-axis linear accelerometer 22 are not a single triaxial accelerometer, then they should be positioned within the housing so that each measures linear acceleration along a linear acceleration axis. The three linear accelerometer axes should be substantially orthogonal.

Similarly, the roll angular rate sensor 26, pitch angular rate sensor 28 and yaw angular rate sensor 30 each have an angular rate sensor axis. The roll angular rate sensor axis, pitch angular rate sensor axis and yaw angular rate sensor axis should be substantially orthogonal. Each angular rate sensor axis should be collinear or substantially collinear with one and only one of the linear accelerometer axes.

The orthogonal relationship of the linear accelerometer axes as well as the orthogonal relationship of the rate sensor axes provides the data recorder with the ability to record all movements of the data recorder.

Figure 2:
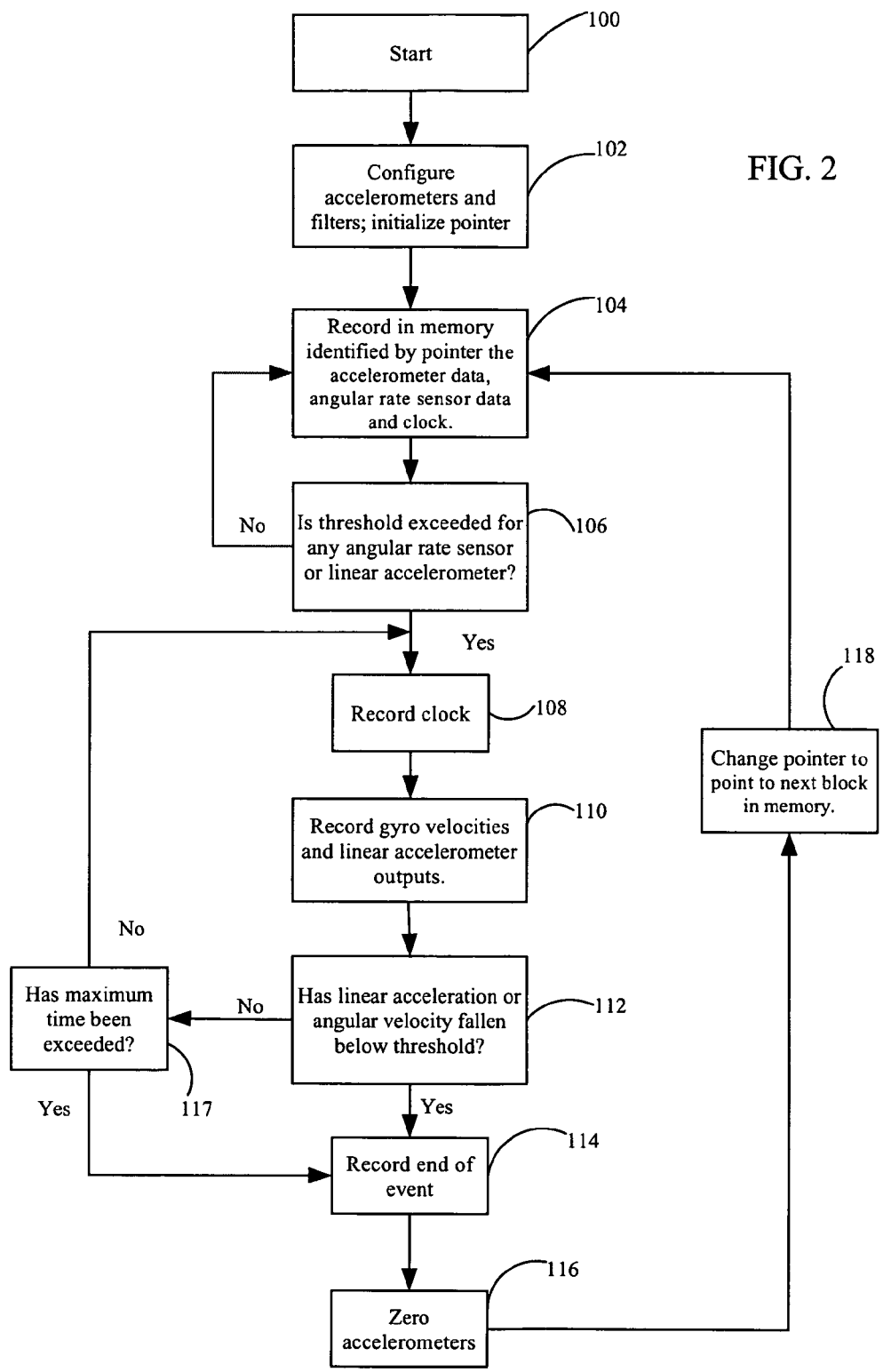
FIG. 2 is a method for operating the data recorder.

FIG. 2 shows the operation of the recorder. During the configuration, a variety of system variables are set by way of communication interface 42.

At system startup, processor 32 configures the filters in filter arrays 12, 44. Step 100. During the configuration, a variety of system variables are set by way of communication interface 42. Each linear accelerometer and each angular rate sensor can have different settings. Additionally, the maximum time for recording of any event is set. X-axis threshold value, Y-axis threshold value, Z-axis threshold value, pitch threshold value, roll threshold value, and yaw threshold value are stored in memory 40. A pointer is initialized to point at the first block in memory 40.

After startup, linear accelerometers 18, 20, 22 and angular rate sensors 26, 28, 30 provide signals to the respective filters 34, 36, 38, 46, 48, 50. ADC 16 continually samples the outputs from gain circuits 56, 58, 60, 62, 64, 66 and provides a digital output of the sampling to processor 32. Processor 32 continually stores the output into memory 40. Step 104.

The outputs from linear accelerometers 18, 20, 22 and angular rate sensors 26, 28, 30 are continually compared with the respective thresholds. Step 106. If any threshold is not exceeded, then the sampling continues. Step 104.

If the threshold has been exceeded for any output of linear accelerometers 18, 20, 22 or angular rate sensors 26, 28, 30, the clock output is recorded. Step 108. The outputs from the angular rate sensors 26, 28, 30 and linear accelerometers 18, 20, 22 are recorded. Step 110.

The linear acceleration or gyro velocity are compared to the threshold. Step 112. If the linear acceleration and gyro velocity are below the threshold, then the end of the event is recorded. Step 114. To avoid continual triggering of the system from a previously recorded event, linear accelerometers 18, 20, 22 are re-zeroed. Step 116.

If the linear acceleration and gyro velocity are not below the threshold, then the length of the event is determined. Step 117. If the maximum length of time for an event has been exceeded, then the end of event is recorded and the linear accelerometers zeroed. Step 114, 116.

The pointer is then moved to point to the next block in memory. Step 118. The system returns to recording the accelerometer data and the angular rate sensor data. Step 104. The process then repeats.

Processor 32 can also be programmed to provide signals through communication interface 42 if a threshold is exceeded. Thus, the system could be used to start or stop other devices. Information about the humidity and temperature of the device could also be recorded.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A data recorder comprising:
an angular rate sensor producing an angular rate sensor output;
a processor coupled to the angular rate sensor;
a memory coupled to the processor for storing the angular rate sensor output; and
an angular rate filter coupled between the angular rate sensor and the processor for allowing the angular rate sensor output to reach the processor only when the angular rate sensor output is within a frequency range.

2. The data recorder of claim 1 where the angular rate sensor is programmable.

3. The data recorder of claim 2 where the angular rate sensor is programmable by one of the processor and a data communication interface.

4. The data recorder of claim 2 further comprising a comparing means for comparing the angular rate sensor output with an angular rate threshold.

5. The data recorder of claim 4 further comprising storing means for storing the angular rate sensor output in the memory if the angular rate sensor output is greater than the angular rate threshold.

6. The data recorder of claim 4 where the processor is configured to store the angular rate sensor output in the memory if the angular rate sensor output is greater than the angular rate threshold.

7. The data recorder of claim 6 further comprising continuous sampling means for continuously sampling the angular rate sensor output.

8. The data recorder of claim 6 where the processor is configured to continuously sample the angular rate sensor output.

9. The data recorder of claim 8 further comprising a gain circuit for amplifying the angular rate sensor output.

10. The data recorder of claim 9 further comprising an analog-to-digital converter coupled to the angular rate sensor output for converting the angular rate sensor output to a digital value.

11. The data recorder of claim 10 further comprising a linear accelerometer producing a linear accelerometer output.

12. The data recorder of claim 11 further comprising a comparator for comparing the linear accelerometer output with a linear acceleration threshold.

13. The data recorder of claim 12 where the processor is configured to store the linear accelerometer output in the memory if the linear accelerometer output exceeds the linear acceleration threshold.

14. The data recorder of claim 13 including a humidity sensor, the humidity sensor producing a humidity sensor output, and the processor is configured to store the humidity sensor output in memory.

15. The data recorder of claim 14 including a temperature sensor, the temperature sensor producing a temperature sensor output, and the processor is configured to store the temperature sensor output in the memory.

16. The data recorder of claim 15 including a data communication interface.

17. The data recorder of claim 16 where the processor is configured to receive information from the data communication interface and the processor is configured to transmit information through the data communication interface.

18. A data recorder comprising:
a first linear accelerometer producing a first linear accelerometer output;
a first angular rate sensor producing a first angular rate sensor output;
a memory;
a processor coupled to the first linear accelerometer, the first angular rate sensor and the memory, the processor configured to store the first linear accelerometer output and the first angular rate sensor output in the memory;
a first linear accelerometer filter for allowing the first linear accelerometer output to reach the processor if the first linear accelerometer output is within a first frequency range; and
a first angular rate sensor filter for allowing the first angular rate sensor output to reach the processor if the first angular rate sensor output is within a second frequency range.

19. The data recorder of claim 18 where the first frequency range and the second frequency range are programmable by the processor.

20. The data recorder of claim 19 further comprising a first angular rate sensor gain circuit coupled to the first angular rate sensor output for amplifying the first angular rate sensor output and a first linear accelerometer gain circuit coupled to the first linear accelerometer output for amplifying the first linear accelerometer output.

21. A data recorder comprising:
an X-axis linear accelerometer producing an X-axis linear accelerometer output;
a Y-axis linear accelerometer producing a Y-axis linear accelerometer output;
a Z-axis linear accelerometer producing a Z-axis linear accelerometer output;
a roll angular rate sensor producing a roll angular rate sensor output;
a pitch angular rate sensor producing a pitch angular rate sensor output;
a yaw angular rate sensor producing a yaw angular rate sensor output;
a memory;
a processor;
a roll filter coupled between the roll angular rate sensor and the processor to allow the roll filter output to reach the processor only if the roll filter output is within a frequency range;
a pitch filter coupled between the pitch angular rate sensor and the processor to allow the pitch filter output to reach the processor only if the pitch filter output is within the frequency range; and
a yaw filter coupled between the yaw angular rate sensor and the processor to allow the yaw filter output to reach the processor only if the yaw filter output is within the frequency range;
wherein the processor is configured to monitor the X-axis linear accelerometer, the Y-axis linear accelerometer, the Z-axis linear accelerometer, the roll angular rate sensor, the pitch angular rate sensor and the yaw angular rate sensor and to store in the memory the X-axis linear accelerometer output, the Y-axis linear accelerometer output, the Z-axis linear accelerometer output, the roll angular rate sensor output, and the pitch angular rate sensor output if one of the X-axis linear accelerometer output, the Y-axis linear accelerometer output, the Z-axis linear accelerometer output, the roll angular rate sensor output, the pitch angular rate sensor output and the yaw angular rate sensor output exceed a pre-determined threshold.

22. The data recorder of claim 21 where the processor is configured to store in the memory a time stamp.

23. The data recorder of claim 22 where an X-axis filter is coupled to the X-axis linear accelerometer, a Y-axis filter is coupled to the Y-axis linear accelerometer, and a Z-axis filter is coupled to the Z-axis linear accelerometer.

24. The data recorder of claim 23 where an X-axis gain circuit is coupled to the X-axis filter, a Y-axis gain circuit is coupled to the Y-axis filter, a Z-axis gain circuit is coupled to the Z-axis filter, a roll gain circuit is connected to the roll filter, a pitch gain circuit is connected to the pitch filter, and a yaw gain circuit is connected to the yaw filter.

25. A method of operating a self-contained data recorder, the self-contained data recorder having a housing, an angular rate sensor with an angular rate sensor output, a processor, an angular rate filter between the angular rate sensor and the processor for allowing the angular rate sensor output to reach the processor only if the angular rate sensor output is within a frequency range, a memory, and a power supply comprising the steps of:
sampling the angular rate sensor output;
comparing the angular rate sensor output with a threshold; and, if the angular rate sensor output is greater than the threshold, storing a plurality of angular rate sensor outputs in the memory.

26. The method of claim 25 further comprising the step of storing a plurality of angular sensor date stamps with the plurality of angular rate sensor outputs.

27. The method of claim 26 further comprising the step of ceasing the storing of the plurality of angular rate sensor outputs in the memory if the angular rate sensor output falls below the threshold.

28. The method of claim 27 further comprising the step of ceasing the storing of the plurality of angular rate sensor outputs in the memory if the storing of the plurality of angular rate sensor outputs exceeds a first time limit.

29. The method of claim 28 further comprising the step of prohibiting the storing of a plurality of angular rate sensor outputs for a first period of time when the storing of the plurality of angular rate sensor outputs exceeds the first time limit.

30. The method of claim 29 where the self-contained data recorder has a linear accelerometer, the linear accelerometer having a linear accelerometer output, further comprising the steps of:
continuously sampling the linear accelerometer output;
comparing the linear accelerometer output with a threshold; and if the linear accelerometer output is greater than the threshold, storing a plurality of linear accelerometer outputs in the memory.

31. The method of claim 30 further comprising the step of ceasing the storing of the plurality of linear acceleration outputs in the memory if the linear acceleration output falls below the linear accelerometer threshold.

32. The method of claim 31 further comprising the step of ceasing the storing of the plurality of linear accelerometer outputs in the memory if the storing of the plurality of linear accelerometer outputs exceeds a second time limit.

33. The method of claim 32 further comprising the step of prohibiting the storing of the plurality of linear accelerometer outputs for a second period of time if the storing of the plurality of linear accelerometer outputs exceeds the second time limit.

34. The method of claim 33 further comprising the step of recalibrating the linear accelerometer after ceasing the storing of the plurality of the linear acceleration outputs.

35. A self contained data recorder comprising:
a housing;
a first linear accelerometer contained within the housing and producing a first linear accelerometer output;
a second linear accelerometer contained within the housing and producing a second linear accelerometer output;
a third linear accelerometer contained within the housing and producing a third linear accelerometer output;
a first angular rate sensor contained within the housing and producing a first angular rate sensor output;
a second angular rate sensor contained within the housing and producing a second angular rate sensor output;
a third angular rate sensor contained within the housing and producing a third angular rate sensor output;
a memory contained within the housing;
a processor contained within the housing;
a first angular rate sensor filter coupled between the processor and the first angular rate sensor for allowing the first angular rate sensor output to reach the processor if the first angular rate sensor output is within a frequency range;
a second angular rate sensor filter coupled between the processor and the second angular rate sensor for allowing the second angular rate sensor output to reach the processor if the second angular rate sensor output is within the frequency range;
a third angular rate sensor filter coupled between the processor and the third angular rate sensor for allowing the third angular rate sensor output to reach the processor if the third angular rate sensor output is within the frequency range; and
and a power supply contained with the housing;
wherein the processor is configured to store in the memory either the first linear accelerometer output, the second linear accelerometer output, the third linear accelerometer output, the first angular rate sensor output, the second angular rate sensor output, or the third angular rate sensor output.

36. The data recorder of claim 35 where the first angular rate sensor measures a first angular rate about a first angular rate sensor axis, the second angular rate sensor measures a second angular rate about a second angular rate sensor axis, and the third angular rate sensor measures a third angular rate about a third angular rate sensor axis, and the first angular rate sensor axis, the second angular rate sensor axis and the third angular rate sensor axis are substantially orthogonal.

37. The data recorder of claim 36 where the first linear accelerometer measures a first linear acceleration along a first linear acceleration axis, the second linear accelerometer measures a second linear acceleration along a second linear acceleration axis and the third linear accelerometer measures a third linear acceleration along a third linear acceleration axis, and where the first linear acceleration axis, the second linear acceleration axis and the third linear acceleration axis are substantially orthogonal.

38. The data recorder of claim 37 where the first linear acceleration axis and the first angular rate sensor axis are substantially collinear, the second linear acceleration axis and the second angular rate sensor axis are substantially collinear, and the third linear acceleration axis and the third angular rate sensor axis are substantially collinear.

39. The data recorder of claim 38 further including a clock for generating a time stamp.

40. The data recorder of claim 39 where the processor is configured to store the time stamp in the memory when the processor stores in the memory the first linear accelerometer output, the second linear accelerometer output, the third linear accelerometer output, the first angular rate sensor output, the second angular rate sensor output, or the third angular rate sensor output.

41. The data recorder of claim 40 where the processor is configured to store the first linear accelerometer output, the second linear accelerometer output, the third linear accelerometer output, the first angular rate sensor output, the second angular rate sensor output, or the third angular rate sensor output only when the first linear accelerometer output, the second linear accelerometer output, the third linear accelerometer output, the first angular rate sensor output, the second angular rate sensor output, or the third angular rate sensor output exceed a threshold.

42. The data recorder of claim 41 where the processor is configured to continuously store the first linear accelerometer output, the second linear accelerometer output, the third linear accelerometer output, the first angular rate sensor output, the second angular rate sensor output, or the third angular rate sensor output only when the first linear accelerometer output, the second linear accelerometer output, the third linear accelerometer output, the first angular rate sensor output, the second angular rate sensor output, or the third angular rate sensor output exceeds the threshold.

43. The data recorder of claim 42 where the processor is configured to stop storing the first linear accelerometer output, the second linear accelerometer output, the third linear accelerometer output, the first angular rate sensor output, the second angular rate sensor output, or the third angular rate sensor output after a select period of time.

44. The data recorder of claim 43 where the processor is configured to calculate a velocity change from the first linear accelerometer output, the second linear accelerometer output and the third linear accelerometer output.

45. The data recorder of claim 44 where the processor is configured to determine a peak linear acceleration from the first linear accelerometer output, the second linear accelerometer output and the third linear accelerometer output.

46. The data recorder of claim 45 further comprising a humidity sensor producing a humidity sensor output and a temperature sensor producing a temperature sensor output, where the humidity sensor and the temperature sensor are contained within the housing and where the processor is configured to store the humidity sensor output and the temperature sensor output.

47. The data recorder of claim 46 further comprising a communication interface contained substantially within the housing allowing for communication of the data recorder with external devices.

48. The data recorder of claim 47 where the communication interface includes a wireless communication device.

* * * * *